United States Patent
Zngf et al.

(10) Patent No.: US 6,870,526 B2
(45) Date of Patent: Mar. 22, 2005

(54) GLOVE MOUSE WITH VIRTUAL TRACKING BALL

(76) Inventors: Frank Zngf, 11Fl.-1, No. 380, Defu Rd., Nan Chiu, Taichung (TW); Stan Huang, No. 29-9, Liu Lin, Nan Hsing Tsun, Lu Chu Hsiang, Tao Yuan Hsien (TW)

( * ) Notice: Subject to any disclaimer, the term of this patent is extended or adjusted under 35 U.S.C. 154(b) by 240 days.

(21) Appl. No.: 10/196,277

(22) Filed: Jul. 17, 2002

(65) Prior Publication Data

US 2004/0012564 A1 Jan. 22, 2004

(51) Int. Cl.[7] .............................. G09G 5/08; G09G 5/00
(52) U.S. Cl. ..................... 345/158; 345/156; 345/157
(58) Field of Search ................................ 345/156, 157, 345/158, 159, 160; 341/20, 21, 22

(56) References Cited

U.S. PATENT DOCUMENTS

| | | | |
|---|---|---|---|
| 4,988,981 A | * | 1/1991 | Zimmerman et al. ....... 345/158 |
| 5,442,729 A | * | 8/1995 | Kramer et al. .............. 704/271 |
| 5,444,462 A | | 8/1995 | Wambach .................... 345/158 |
| 6,049,327 A | * | 4/2000 | Walker et al. .............. 345/158 |
| 6,097,369 A | | 8/2000 | Wambach .................... 345/158 |
| 6,154,199 A | | 11/2000 | Butler ........................ 345/167 |
| 6,215,498 B1 | * | 4/2001 | Filo et al. ................... 345/419 |

* cited by examiner

*Primary Examiner*—Vijay Shankar
(74) *Attorney, Agent, or Firm*—Troxell Law Office, PLLC

(57) ABSTRACT

A glove-like apparatus mounted on a user's hand to control the cursor movement and to click for providing functions of a computer mouse. The apparatus has a glove-like body with multiple finger tubes. A tilt sensor is mounted on the glove metacarpus, of which the roll angle of the hand is detected to determine the moving orientation of the cursor. Two pairs of bending sensors are mounted on the thumb tube and the index finger tube, each pair of the sensors is used to detect a bending angle of the corresponding finger. The bending of the thumb or the index finger at a time is used to move the cursor in the negative or the positive direction along the located orientation line. The data glove for cursor control is operated as a virtual mouse with a virtual tracking ball.

8 Claims, 3 Drawing Sheets

GLOVE MOUSE WITH VIRTUAL TRACKING BALL

FIELD OF THE INVENTION

The present invention relates to a computer mouse, and more particularly to a data glove as a virtual mouse for controlling cursor movement and click functions.

BACKGROUND OF THE INVENTION

A computer mouse is an input device which the user can move over a 2D plane that the cursor on the screen will move, correspondingly. And there are two or three buttons on the mouse which allow the user to click and select. The disadvantage of the conventional mouse is that a pad area is needed for mouse to work on. Also, the user has to move his/her hand back and forth between the keyboard and the mouse frequently for word processing.

Examples of apparatuses are known to relieve above drawbacks. A hand positioned mouse is disclosed by U.S. Pat. No. 6,154,199 wherein a physical tracking ball is mounted on a glove for position control of the cursor. The tracking ball is operated as the one mounted on a notebook computer except that it is mounted on the side of the index finger of the glove and operated by the thumb. The limitation is that the tracking ball have to be small to be mounted on a finger and the position control of a cursor appears to be unstable and lacks dexterity. Another apparatus is disclosed by U.S. Pat. Nos. 5,444,462 and 6,097,369 wherein a glove-like body is to be worn on the hand of the computer operator. Each direction of the cursor motion is controlled by sensing the direction of movement of a user's body element, for example, the index finger and transmits corresponding signals to move the cursor in the corresponding direction, motion in each direction can be switch ON or OFF with respect to either of the two opposite senses. Thus, two elements of the user's body control UP/DOWN and LEFT/RIGHT of the X-Y directions of the cursor. It is noted that a threshold position has to be defined for the two opposing directions to be switched ON or OFF, it is not easy to operate with that threshold in mind and the motion range of the body element for each direction is very limited.

The objective of this invention is to provide an alternative mouse glove which mimic the operation of a tracking ball. A new concept of a virtual tracking ball is introduced to design such a device. Because the tracking ball is virtual that it can be large enough to fit just for operation of any user, and it is weightless. The actions operated with the mouse glove can be performed ergonomically and be mapped to the operation of a real mouse naturally. Only one linear motion is controlled by the user, and of which the movements of the two senses, respectively, are operated by the thumb and a corresponding finger. Therefore, the user does not have to worry about the finger's position to be in positive or in negative sense. The other dimension for control is the orientation of the movement, which is controlled by sensing the rolling of the hand. With such a design, it is expected that the glove mouse is able to be operated ergonomically with great efficiency.

SUMMARY OF THE INVENTION

In accordance with one aspect of the present invention, there provides a mouse glove with a virtual tracking ball for cursor control of a computer, wherein the mouse glove is equipped with two pair of bending sensors mounted on the thumb and one of the other fingers said index finger and a tilt sensor mounted on the metacarpus of the user's hand. When the hand rolls, the tilt sensor on the metacarpus detects the rolling angle which determine an orientation of the direction line of the cursor movement on a computer screen. A virtual tracking ball is imagined to be held between the thumb and the index finger and the center of orientation was placed at the middle between the thumb and the index finger. The thumb is used to push the cursor from the thumb end to the center and the index finger to push from the index end to the center along the direction line, thus the bending of the thumb and the finger corresponds to the cursor movement in two opposite senses along a direction line. Each pair of the bending sensors is activated only in one bending direction with either the thumb or the finger, i.e., the inside bending to bend from an end to the center. For each pair of bending sensors, one is used for control of cursor movement on a larger scale; the other is used for adjustment of fine tuning. With such an arrangement, the control of cursor movement can be efficient and precise.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 3a shows the changes of direction lines by rolling a hand FIG. 3b shows a mapping to the cursor moving directions for the changes of direction lines by rolling a hand shown as in FIG. 3a.

DETAILED DESCRIPTION OF THE PREFERRED EMBODIMENTS

Figure 1:
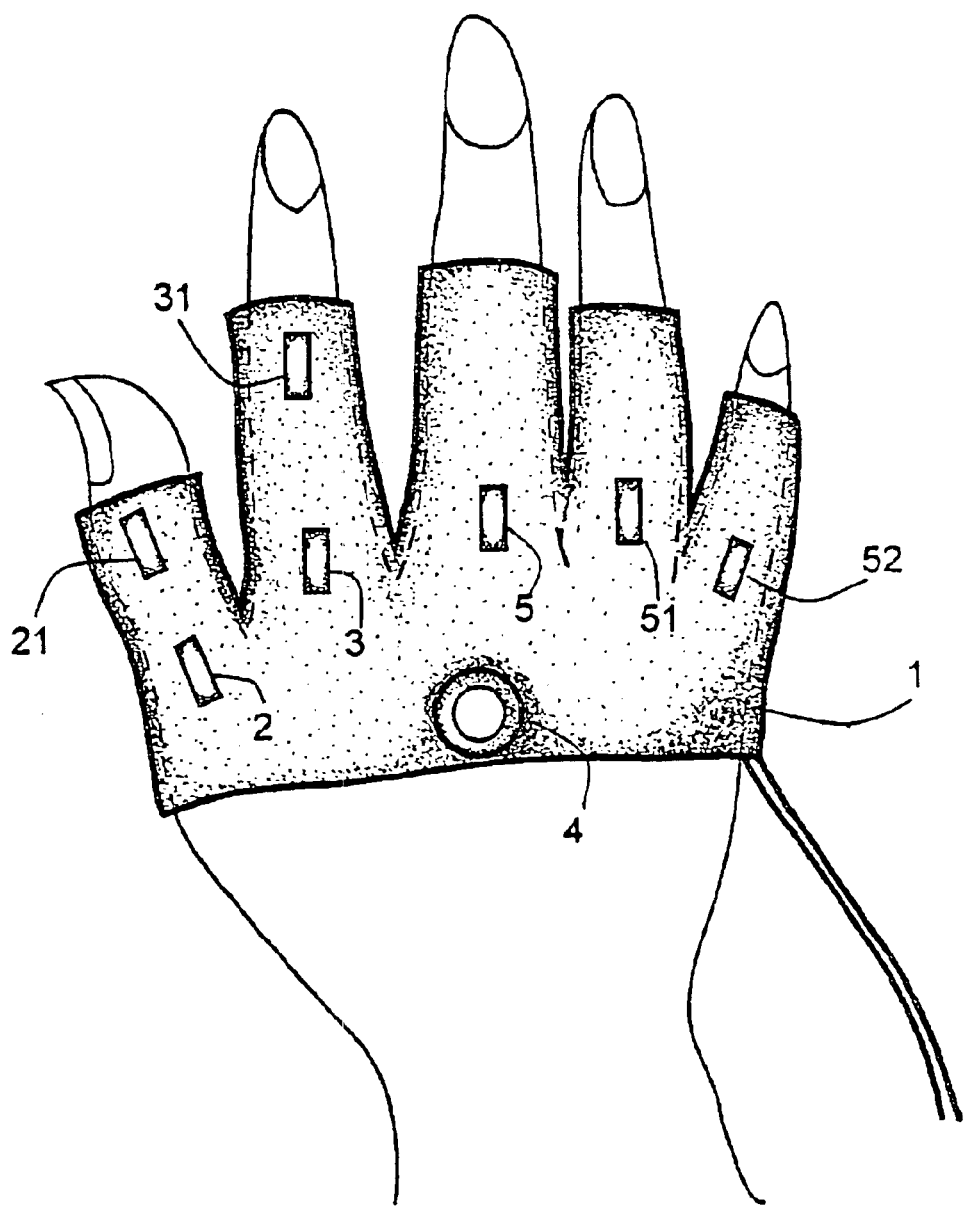
FIG. 1 is the top plan view of a glove mouse in accordance with the present invention.
Figure 2:
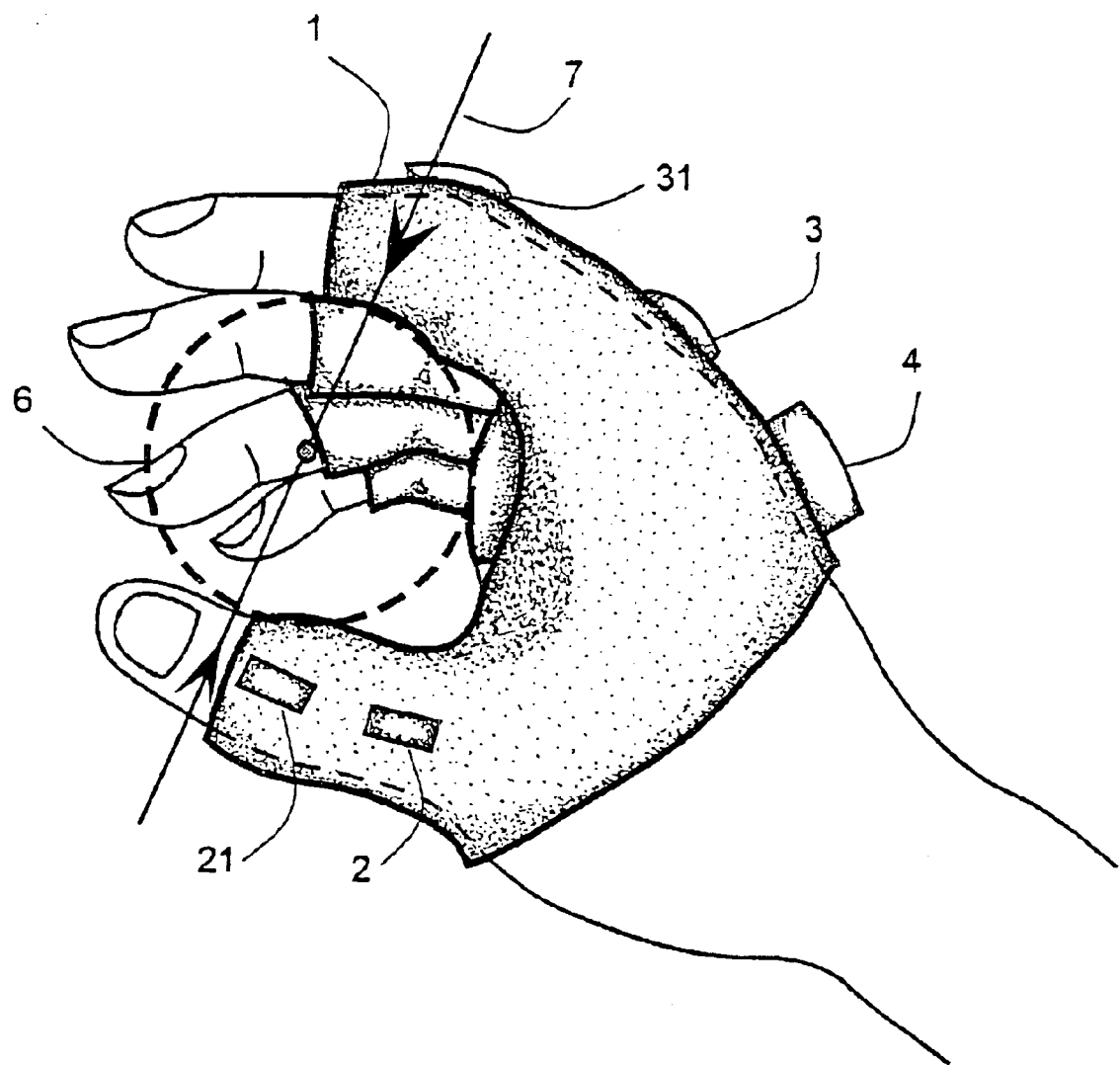
FIG. 2 is an operative side plan view of the glove mouse in FIG. 1 with a virtual tracking ball.

Referring to FIGS. 1 and 2, the glove mouse comprises a glove body 1 which is an apparel worn on the right hand of a computer user. The glove body 1 is equipped with two bending sensors 2 and 21 on the glove thumb, two bending sensors on the index glove finger 3 and 31, a tilt sensor 4 on the metacarpus, and three bending sensors 5, 51 and 52 on the middle finger, ring finger and little finger respectively.

In order to increase the controllability and sensitivity of the finger's bending for the control of cursor movement, two bending sensors cooperate to control the move in a single sense of direction. The bending sensors 2 and 21 mounted on the glove thumb are used to detect a bend angle change of the thumb to move the cursor along a particular direction. Each time an angle increment, which the thumb bends with, is added to the movement of the cursor as an increment to the current position. When the thumb stretches back, the increment automatically stops. The bending sensor 2 mounted at metacarpophalangeal joint is used for a move with a large scale distance and the bending sensor 21 mounted at proximal interphalangeal joint is used for a fine tuning of a move. Such a two-stage movement control will make the positioning of the cursor both fast and precise.

The bending sensors 3 and 31 mounted on the glove index finger are used to detect the angle bend of the index to move the cursor along a direction opposing to the direction moving by the thumb. The bending sensors 3 and 31 are mounted, respectively, at metacarpophalangeal joint for a large scale move and at proximal interphalangeal joint for fine tuning.

A tilt sensor 4 mounted on the metacarpus is used to detect the tilting angle of the metacarpus by rolling the hand, which corresponds to a angle of the direction line along which the cursor is able move.

Three bending sensors 5, 51 and 52 are mounted on the middle, ring and little finger respectively. Each is used to detect the crossing of a threshold angle of the bend of the corresponding finger to represent that the mouse click is turned ON. Or alternatively, a combination of the bends of two or more can also be used for this CLICK identification.

Figure 3:
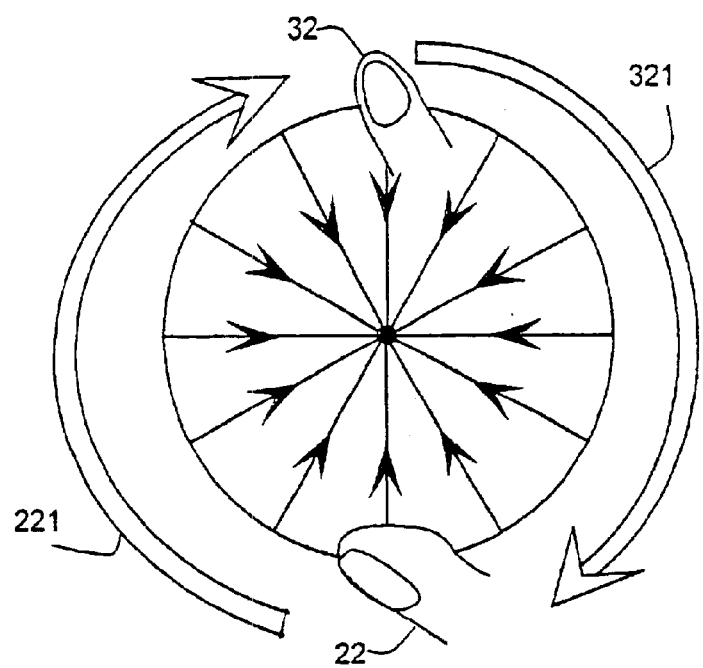
Figure 3:
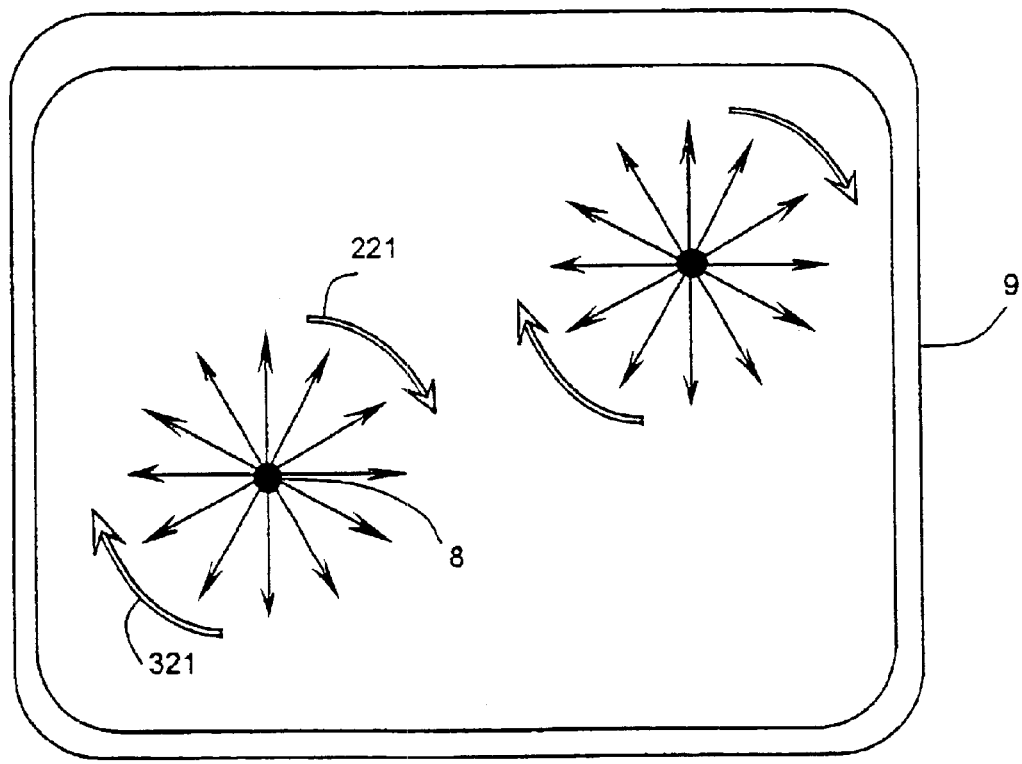

Referring to FIG. 2, the hand of a user worn with the glove mouse 1 is just like holding a virtual tracking ball 6 and the glove can be imagined as the corresponding socket. When the hand rolls as if the thumb and the fingers slide circularly through the surface of the virtual tracking ball. The plane formed by the thumb and the index finger is used to define a great circle on the virtual socket which moves relative to the virtual tracking ball. The great circle and its on-plane incline with respect to the horizontal plane while the hand is rolling. Referring to FIGS. 2 and 3, the great circle in a particular inclination is mapped to a direction line on the computer screen. The line 7 on the great circle crossing the thumb and the index finger is the direction line for the mapping to the cursor moving direction line on the computer screen.

Referring to FIG. 2, the hand rolls to a resting position, the direction line 7 for movement of the cursor is determined. Facing forward to the screen with the thumb at the bottom and the index finger on the top, the right hand can roll clockwise in 180 degrees. Then, the thumb will rolls up and the index finger rolls down. The angle range of direction lines controllable by either of the thumb or the finger is 180 degrees. Such range of hand positions also approaches the limit that one's hand can do. With such an amazing human innate trait, the orientation range of rolling of the hand covers all possible cursor moving directions on the screen, i.e., directions in a full circle 360 degrees.

Referring to FIGS. 3a and 3b, with the cursor moving orientation determined, the cursor 8 is pushed to move by the thumb or by the index finger. The pushing directions as shown in FIG. 3a, with the hand rolling clockwise 180 degrees initially with the thumb 22 at the bottom, the thumb can control directions in range 221 in the left half disk and the index finger 32 controls the directions in range 321 in the right half disk. The pushing directions of the hand as shown in FIG. 3a are mapped to the cursor moving directions on the screen 9 in FIG. 3b.

While we have shown and described the embodiment in accordance with the present invention, it should be clear to those skilled in the art that further embodiments may be made without departing from the scope of the present invention.

What is claimed is:

1. A glove mouse for providing cursor movement control for a cursor and click functions of a computer comprising:
    a glove body formed with a plurality of glove fingers to be worn on a hand of a computer user;
    two first bending sensors mounted on a thumb glove finger for a thumb and detecting an increment of bending angle of the thumb and to move the cursor a distance along a first direction;
    two second bending sensors mounted on an index above finger for an index finger and detecting an increment of bending angle of the index finger to move the cursor along a second direction opposite the first direction; and
    a tilt sensor mounted on a metacarpus of the glove body and detecting a rolling tilt angle of the metacarpus which defines an angle of a direction line along which the cursor is moved by one of the thumb and the index finger.

2. A glove mouse as claimed in claim 1 further comprising:
    a plurality of third bending sensors, one of the plurality of third bending sensors is mounted on each of a middle glove finger, a ring glove finger, and a little glove finger, wherein a bending angle of one of a middle finger, a ring finger, and a little finger over a predefined threshold is detected to represent an ON state of a particular mouse click.

3. A glove mouse as claimed in claim 1, wherein one of the first and the second bending sensors are positioned to measure the bending angle of a proximal interphalangeal joint.

4. A glove mouse as claimed in claim 1, wherein one of the first and the second bending sensors are positioned to measure the bending angle of a metacarpophalangeal joint.

5. A glove mouse as claimed in claim 1, wherein one of the first and the second bending sensors are positioned to measure the combination bend of metacarpophalangeal and proximal interphalangeal joints.

6. A glove mouse as claimed in claim 2, wherein one of the first and the second bending sensors are positioned to measure the bending angle of a proximal interphalangel joint.

7. A glove mouse as claimed in claim 2, wherein one of the first and the second bending sensors are positioned to measure the bending angle of a metacarpophalangeal joint.

8. A glove mouse as claimed in claim 2, wherein one of the first and the second bending sensors are positioned to measure the combination bend of metacarpophalangeal and proximal interphalangeal joints.

* * * * *